Patented Oct. 7, 1924.

1,510,469

UNITED STATES PATENT OFFICE.

THOMAS R. DUGGAN, OF NEW YORK, N. Y., ASSIGNOR TO THE PERMUTIT COMPANY, OF NEW YORK, N. Y., A CORPORATION OF DELAWARE.

PROCESS OF REGENERATING BASE-EXCHANGE SILICATES.

No Drawing. Application filed October 15, 1918. Serial No. 258,223.

*To all whom it may concern:*

Be it known that I, THOMAS R. DUGGAN, a citizen of Great Britain, residing at New York, in the county of New York and State of New York, have invented certain new and useful Improvements in Processes of Regenerating Base-Exchange Silicates, of which the following is a specification.

This invention relates to water purification; and it comprises a method of effecting an economical and methodical regeneration or revivification of a charge or bed of exchange silicates after use in softening water, wherein such a bed is treated with salt solution to extract impurities taken up thereby, and the salt solution, or a portion of it, after it has passed through the bed is reclaimed and if necessary purified by precipitating such impurities therefrom and is then returned for reuse; and it more particularly comprises a method wherein the bed is treated with a plurality of successive portions of salt solution, with reutilization of certain of said portions, the reused portions being employed in a subsequent regeneration, either directly or after a treatment to remove undesired amounts of alkaline earths in solution, the reuse being in such an order that portions of solution containing larger amounts of alkaline earths are passed through the bed prior to portions containing smaller amounts; all as more fully hereinafter set forth and as claimed.

The older methods of softening hard water by the use of precipitants are rapidly giving way to the more modern expedient of using what are known as exchange silicates or zeolites; complex hydrated silicates containing alkali and an amphoteric oxid, generally alumina or iron, or both together. In this art, the term zeolite has acquired a meaning somewhat different from that given it in mineralogy where it is taken to mean certain crystallized silicates. As used in the water purifying art the term zeolite is much broader covering any body, whether crystallized, amorphous or colloid, which has the property of exchanging bases more or less rapidly for the bases of a solution brought into contact with the zeolite. As precipitants for the hardness-giving components of hard water a number of chemical materials have been proposed, such as lime, sodium hydroxide or caustic soda, sodium carbonate, barium hydroxide or caustic baryta, barium carbonate, etc., or several of these together. As a rule however lime, or lime and carbonate of soda together are generally used. There is a natural limit to the efficiency of such a process since calcium carbonate (carbonate of lime) is not wholly insoluble in water and the precipitation therefore cannot wholly remove the hardness. With exchange silicates on the other hand, the hardness can be, and usually is, wholly removed with production of completely softened water. A water softening plant using exchange silicates is also simpler of installation and operation, being in fact practically automatic in operation; and it presents many other advantages. It is an object of the present invention to secure certain economies in operation of such a plant.

As usually installed, the exchange silicates are contained as a granular bed in a suitable casing. The hard water is passed through this bed, emerging therefrom in a softened condition. After a time, as the bed becomes charged with lime or magnesia, or both, taken up from the hard water, it becomes necessary to discontinue the softening operation and regenerate the silicates of the bed. This is done by passing a salt solution therethrough. In the presence of the dissolved salt the silicates give up their lime and magnesia which go into solution as calcium and magnesium chlorids and take up sodium in their lieu. After removal of the salt solution, the bed is then ready for reuse in softening water. If the raw water is reasonably clean and free from mud, bacteria, etc., or is filtered before softening, cleaning out of impurities mechanically retained in the bed can easily be accomplished by backwashing which may be done occasionally after the softening period or combined with regeneration, for instance, when washing out the remaining salt solution.

In the stated operation with exchange silicates or zeolites it will be noted that the only chemical consumed is ordinary salt (NaCl), the exchange silicates being susceptible of use and reuse for indefinitely long periods. Salt is of course a cheap material and the amount necessary in softening even very hard waters is not great, while with waters of medium hardness the amount required is still less. Nevertheless, it is possible to effect economies in its use; and it is the purpose of the present invention so to do.

In the passage of the hard water through the bed of exchange silicates, the larger part of the soluble impurities abstracted from it (lime and magnesia) accumulates at the face of entry of the water. If the water goes downward through the bed, the upper layers of granules are much more charged or contaminated with impurities than the lower layers, while the reverse is the case if the water passes upwardly through the bed. As I have pointed out in another application (Serial No. 127,127, my United States Patent, 1,276,629, August 20, 1918), in regeneration it is desirable to make the salt solution pass through the bed in the opposite direction to that of the water in softening and remove it after contact with the bed. In so doing, the impurities dissolved by the salt solution from the most contaminated granules are carried away without coming into contact with less contaminated or clean granules. In other words, if the flow of water in softening is downward, it is desirable to pass the flow of salt solution in regeneration upward and remove it at a point above the bed, so that it does not again come in contact with the silicates.

Regeneration is a phenomenon depending on many factors, concentration of solution, time of contact, etc., but in a general way it may be said that the first portion of a given salt solution coming into contact with a contaminated granule takes up very much more lime and magnesia than the next portion, and so on. In other words, the first portion of salt solution going through a bed is much more completely utilized and accordingly the effluent is more contaminated than is the case with the next portion.

This difference is particularly marked where the invention of said application Serial No. 127,127 (now United States Patent No. 1,276,629) is employed, the regenerating salt solution being passed through the bed in an upward direction, or a direction opposite to that of the flow of water in softening, with removal after passage without repassage or opportunity again to come into contact with the zeolites; but it always obtains to a greater or less extent. Where salt solution and water pass through the bed in the same direction or where the salt passes through the bed downwardly there is less difference between the composition of the first emerging salt solution and later emerging salt solution, than where opposite flow or upward flow of the salt solution is used; but there is still a difference.

In the present invention I segregate into various portions the emerging salt solution which has gone through the bed of silicates and has absorbed impurities therefrom. I have found that by segregating into portions the salt solution passing off when regenerating downwardy and using it in the earlier stages of a following regeneration, large amounts of salt solution wasted at present can be saved, and that in both cases, either in upward or in downward regeneration, still larger amounts of salt solution can be reclaimed and saved if the contaminated brines not suitable for direct reuse are treated before reuse, in order to remove or reduce the amount of the undesirable salts (lime and magnesia) dissolved therein. The first segregated portion which has absorbed the most lime and magnesia is stored separately or is discarded while the next portion or portions which have absorbed less alkaline earths may be treated with precipitating chemicals, usually carbonate of soda or sodium hydroxid or mixtures of the two to throw out the lime and magnesia. This renders the purified portion or portions which were too contaminated to be used suitable for reuse in regeneration.

The circumstances in each individual case control as to the necessity of regeneration of any given portion prior to reuse since obviously the more lime and magnesia occurring in the silicates the greater is the proportion which can be tolerated in the salt solution passed through and vice versa.

In an advantageous specific embodiment of the present invention, a bed of exchange silicates is used for softening water with downward flow of water therethrough and a solution of salt is then allowed to flow upward through the bed. As the salt solution advances upward it displaces the water remaining in the bed before it without much admixture or channeling. This displaced water is taken off above the bed. After salt solution has reached the upper level, the flow may be interrupted for a time and then resumed. Whenever the salt solution emerges from the upper face of the bed it is drawn off and tested. It will at first be found highly charged with calcium or magnesium chlorid, or both, but it rapidly becomes purer. The ratio of calcium or magnesium chlorid to sodium chlorid follows a descending curve. The first portion if it be too rich in calcium or magnesium chlorid and too poor in salt to be worth recovering may be discarded and sent to waste or it may be utilized to recover calcium or magnesium chlorid or magnesia by appropriate methods. The next portion which contains some calcium or magnesium chlorid but is rich in sodium chlorid may be used directly in an earlier stages of a following regeneration or if the amounts of calcium and magnesium are high it may be treated with an amount of sodium hydroxid or sodium carbonate as a precipitating agent corresponding to the calcium or magnesium chlorids present and precipitation allowed to take place. Various precipitants may be employed, the choice depending to some extent upon the particular chlorids present. Where it is mainly calcium chlorid, sodium carbonate is a good precipitant, but where there are substantial proportions of magnesium chlorid, it is better to employ some caustic soda in connection with the sodium carbonate since magnesium is more efficiently precipitated as the hydroxid than as the carbonate. Lime and sodium carbonate used together may replace the mixture of sodium carbonate and hydroxid. The amount or proportion of the reclaimed regenerating brines to be treated depends upon the ratio of calcium and of magnesium to sodium in the liquid and the varying ratio between the same elements in the silicates at that time when the liquid is intended to be reused. After filtering or decanting, the recovered and treated salt solution is returned for reuse in regeneration. Presuming that the amount of salt solution sent through the bed is equivalent to three times the volume of the voids in said bed, the first third may be discarded for the present purposes and the second third may be reused after treatment while the third third may be used without treatment. The third portion serves mainly, in effect, for displacing the second portion and as a rule is so pure as to need no recovery treatment. In a methodical embodiment of my process therefore, presuming that economic conditions render it advisable to segregate the three portions in the manner just described, in regeneration the first portion of salt solution which is passed through the bed will be a recovered solution from another operation. This recovered portion may be a treated or an untreated portion from a prior regenerating treatment, but in any event it will be one sufficiently free from magnesium and calcium to be able to exercise a regenerating influence on the bed; i. e., it will be purer in this respect than the silicates of the bed; but it will ordinarily be less pure than the next following portion. After passage, it may be recovered and treated again or it may be discarded. The second portion of solution sent through is a solution with a medium ratio of alkaline earths and it may be purified or not purified after use, while the third portion sent through is a fresh solution which in most cases can be reused without further treatment in another regeneration.

While I have stated the segregation of the brine into three equal portions, it is of course obvious that the point where the cut-off is made for different disposal of the various portions of salt solution going through the bed of used silicates depends wholly upon the analysis of the various portions, the relative cost of sodium hydroxid or carbonate of soda as compared with salt and such like economic factors. In practice, the segregation is rarely into equal portions; and it often happens that the portion discarded as too contaminated as to be worth recovering, is as little as, say, 10 per cent of the whole. By operating with the water flowing in one direction and salt solution in the other, it is commonly practical to make the proportion of the discarded salt solution much less than where the two flows are in the same direction; and the amounts will be less when regenerating upwardly than when regenerating downwardly. All the salt solution may be recovered by treatment with sodium hydroxid or sodium carbonate or both but I usually regard this as less practical than discarding or otherwise using the more contaminated portion and recovering the less contaminated portion.

After regeneration, the salt solution remaining in the bed must be displaced or washed out with water to fit the bed for further action in softening water. This yields wash waters containing some salt. The first portions of wash water used may or may not contain relatively large amounts of the salt; this depending upon whether removal of the final salt solution be so conducted as to be by simple displacement or by admixture and dilution. For example towards the end of the regeneration when the bed still contains the final portion of salt solution, if this be removed downwardly and water be introduced from above for washing, very little admixture of the salt solution and the water takes place since the heavier salt solution passes downward under the overlying lighter water without much admixture. If, on the other hand, the bed being full of salt solution, if water is introduced from below for displacing such salt solution and the displaced solution is removed above, more admixture will take place. In any event I commonly use the portions of wash water which contain the most salt for producing the stronger salt solution necessary in regeneration; the additional proportion of salt necessary for producing such a regenerating solution being simply added to the salty wash water. For example, the exchange silicates may be washed with three portions of salt solution as described, the first emerging portion being discarded, the second emerging portion being purified and the third emerging portion being simply stored for another operation. The following wash water is then used to make a fresh portion of salt solution. In the next regeneration the purified brine or the displacing brine from the first regeneration, whichever is the more contaminated goes through first, and finally a salt solution made from the salt added to the wash waters of the first regeneration.

Where the same concentration of salt solution is used throughout the regeneration process, all the portions of effluent passing through the bed may be collected together and treated collectively; but it is ordinarily better to treat the separate portions separately. In washing to remove salt solution in the pores of the granules, a salt solution is obtained which does not ordinarily contain either calcium or magnesium and it is desirable that it be used in producing regenerating solutions for this reason as well as for the advantage of saving salt. It is also a saving in water.

It is not always necessary or expedient to conduct the regeneration of a used bed with solutions of salt of the same concentration throughout; and on the other hand it is often desirable to have the first portions of liquid going through the bed weaker in salt than subsequent portions. For example, in one method of operation a bed of exchange silicates, which has been used and is ready for regeneration, may be treated with a comparatively weak salt solution and then with a stronger salt solution. Or, the salt solution employed may progressively increase in strength throughout the regeneration. Again, in washing out the bed after a regeneration operation portions of salt solution are obtained more or less diluted with wash water or portions of wash water are obtained containing considerable amounts of salt, the latter being the case particularly where washing out of a bed containing adhering salt solution is done in an upward direction. By the present invention a method of usefully employing these solutions of varying or various strengths is afforded. In the regeneration, as a rule, the utilization of the salt contained in a given solution is relatively better if the solution is dilute than where it is more concentrated, but regeneration requires a longer period of time with a weaker solution than with a stronger, and of course larger containers are required for the dilute salt solutions than for more concentrated. The particular way in which a regeneration is effected is always controlled by the conditions; but in a general way it may be said where a very thorough regeneration in a short period of time is required the use of concentrated solutions is indicated, while for a thorough utilization of salt, where plenty of time may be taken, the use of weaker solutions is better.

If solutions of different concentrations are used, even those parts of the regenerating liquid which are first removed from the bed may be made use of again in a following regeneration without purifying the solution, or without purifying it completely, from dissolved salts taken up from the silicates in the previous regeneration if the concentration of the reclaimed solution is increased by dissolving more salt in it; that is a weak solution may be used for the first contact in a regeneration operation and may, without purification or complete purification, be strengthened by dissolving salt in it and used again. There are many possible combinations which all can be utilized for saving salt. Which is the most economical in a given case depends on the relative cost of the reagents, on the cost of water and on local conditions, and furthermore whether there is space available for storage tanks, etc. Of course any reclaimed solution may be used to dissolve further amounts of salt in it.

What I claim is:—

1. In the regeneration of exchange silicates used for softening water, the process which comprises passing salt solution through such a used bed in a downward direction and reclaiming the more contaminated and the less contaminated effluent salt solution in later parts of the regeneration period for reuse in the earlier stages of a subsequent regeneration.

2. In the regeneration of exchange silicates used for softening water, the process which comprises passing salt solution through such a used bed, discarding the first portion of the used salt solution, segregating a later portion, and removing all or some of the lime and magnesia contained in the portion segregated in order to render it suitable for reuse in a subsequent regeneration.

3. In the regeneration of exchange silicates used for softening water, the process which comprises passing a salt solution through the bed, discarding the emerging salt solution as long as it shows a high content of calcium or magnesium chlorid, segregating the following portions of emerging salt solution, removing some or all of the calcium and magnesium chlorids contained therein by adding a suitable sodium salt to precipitate the lime and magnesia compounds in an amount equivalent to the amount of calcium or magnesium chlorid to be removed, separating the precipitate and returning the purified salt solution for reuse in a subsequent regeneration.

4. In the regeneration of exchange silicates used for softening water, the process which comprises passing a salt solution through such a used bed, segregating the emerging effluent according to the content of calcium and magnesium dissolved therein, treating those portions which contain high amounts of dissolved lime and magnesia by precipitating lime and magnesia in order to reduce or remove the same and then reusing the different portions of salt brine reclaimed in a following regeneration in such an order that those containing the highest amounts of lime and magnesia are used first and those containing none, or the smallest amount, last.

5. In the regeneration of beds of exchange silicates after softening water thereby, the process which comprises passing successive portions of salt solution through such a bed and again passing certain portions of the liquid so passed through a bed in a succeeding regeneration in such an order that portions more contaminated with impurities taken up from the exchange silicates in the first operation are so passed in the second operation before portions less contaminated in the first operation.

6. In the regeneration of beds of exchange silicates after softening water thereby by passing successive portions of regenerating solutions of different strength through the beds, the process wherein solutions which contain the salt used for regeneration in different concentrations and in addition to such salt, other salts coming from a previous regeneration, are passed through the beds in such an order that the solutions more contaminated by dissolved impurities from previous regenerations and weaker in regard to the salt used for regeneration are passed through the bed first and a solution purer and more concentrated as to said regenerating salt, thereafter.

7. In the regeneration of exchange silicates used for softening water, the process which comprises passing salt solution through a bed of such material in a downward direction and segregating contaminated and uncontaminated effluent salt solution in later parts of the regeneration period for reuse in the earlier stages of a subsequent regeneration, said segregated portion being collected in separate portions of different purity.

8. In the regeneration of zeolite beds used for softening water, the process which comprises using in initial stages of such regeneration, a salt solution which has been used in later stages of a preceding regeneration.

9. In the softening of water by zeolitic bodies wherein such a body is alternately subjected to water to be softened and to a salt solution capable of regenerating exhausted softening properties in such body, the process which comprises employing in each succeeding regeneration portions of salt solution which have been employed in a preceding regeneration.

10. In the softening of hard water, the process which comprises alternately passing hard water and salt solutions through a bed of exchange silicates and in the passage of salt solution, employing salt solution which has previously been in contact with the exchange silicates.

11. In the methodical utilization of salt in regenerating beds of exchange silicates used in softening water, the process which comprises regenerating such beds by a plurality of portions of salt solutions passed therethrough followed by wash water, later portions of salt solution in a prior regeneration being used as earlier portions in a subsequent regeneration.

12. In the methodical utilization of salt in regenerating beds of exchange silicates used in softening water, the process which comprises regenerating such beds by a plurality of portions of salt solution passed therethrough, followed by wash water, relatively weak later portions of salt solution from a prior regeneration being strengthened by dissolving salt therein and used as early portions in a subsequent regeneration.

13. In the methodical utilization of salt in regenerating beds of exchange silicates used in softening water, the process which comprises regenerating such beds by a plurality of portions of salt solutions passed therethrough followed by wash water, later portions of salt solution in a prior regeneration being used as earlier portions in a subsequent regeneration, and wash water being strengthened in salt to furnish regenerating solution.

In testimony whereof, I affix my signature hereto.

THOS. R. DUGGAN.